(12) United States Patent
Silva, Jr. et al.

(10) Patent No.: US 11,666,790 B2
(45) Date of Patent: Jun. 6, 2023

(54) CHEMICALLY JOINED SPRINKLER ASSEMBLY AND FITTING WITH INTERNAL RESERVOIR

(71) Applicant: Tyco Fire Products LP, Lansdale, PA (US)

(72) Inventors: Manuel R. Silva, Jr., Cranston, RI (US); Steven Lee Shields, Lubbock, TX (US); Gary J. Luiz, Warwick, RI (US)

(73) Assignee: Tyco Fire Products LP, Cranston, RI (US)

( * ) Notice: Subject to any disclaimer, the term of this patent is extended or adjusted under 35 U.S.C. 154(b) by 409 days.

(21) Appl. No.: 16/645,129

(22) PCT Filed: Sep. 7, 2018

(86) PCT No.: PCT/US2018/049961
§ 371 (c)(1),
(2) Date: Mar. 6, 2020

(87) PCT Pub. No.: WO2019/051234
PCT Pub. Date: Mar. 14, 2019

(65) Prior Publication Data
US 2021/0162248 A1    Jun. 3, 2021

Related U.S. Application Data

(60) Provisional application No. 62/556,046, filed on Sep. 8, 2017.

(51) Int. Cl.
*A62C 35/68*    (2006.01)
*B29C 65/48*    (2006.01)
(Continued)

(52) U.S. Cl.
CPC ............... *A62C 35/68* (2013.01); *B05B 3/00* (2013.01); *B29C 65/483* (2013.01);
(Continued)

(58) Field of Classification Search
CPC ........... A62C 35/68; A62C 31/02; B05B 3/00; B29C 65/483; B29C 65/7832;
(Continued)

(56) References Cited

U.S. PATENT DOCUMENTS 4,712,812 A    12/1987  Weir, III
4,905,766 A     3/1990  Dietz et al.
(Continued)

FOREIGN PATENT DOCUMENTS

JP    2017-077286    4/2017

OTHER PUBLICATIONS

International Search Report and Written Opinion for International Application No. PCT/US2018/049961, dated Nov. 6, 2018, 11 pages.

*Primary Examiner* — Christopher S Kim
(74) *Attorney, Agent, or Firm* — Foley & Lardner LLP (57) ABSTRACT

A sprinkler assembly includes a sprinkler body and a tubular connection fitting. The tubular connection fitting includes a first end for connection to a fluid supply pipe and a second end with the sprinkler body inserted therein, the tubular member including an outer surface and an inner surface defining an internal conduit extending along a longitudinal axis, the inner surface of the tubular member includes a first stop surface spaced from the first end to define an insertion depth for the fluid supply pipe and a second stop surface to limit insertion of the sprinkler body into the second end. The first stop surface defines an annular channel for housing an end of the fluid supply pipe.

7 Claims, 6 Drawing Sheets

(51) Int. Cl.
- *B29C 65/78* (2006.01)
- *B29C 65/00* (2006.01)
- *F16L 13/11* (2006.01)
- *B05B 3/00* (2006.01)
- *A62C 31/02* (2006.01)

(52) U.S. Cl.
CPC ...... *B29C 65/7832* (2013.01); *B29C 65/7835* (2013.01); *B29C 66/1282* (2013.01); *B29C 66/12441* (2013.01); *B29C 66/12445* (2013.01); *B29C 66/12469* (2013.01); *B29C 66/12841* (2013.01); *B29C 66/322* (2013.01); *B29C 66/52241* (2013.01); *B29C 66/5344* (2013.01); *B29C 66/71* (2013.01); *B29C 66/73921* (2013.01); *F16L 13/116* (2013.01); *A62C 31/02* (2013.01)

(58) Field of Classification Search
CPC .......... B29C 65/7835; B29C 66/12441; B29C 66/12445; B29C 66/12469; B29C 66/1282; B29C 66/12841; B29C 66/322; B29C 66/52241; B29C 66/5344; B29C 66/71; B29C 66/73921; F16L 13/116
USPC .......................................................... 169/37
See application file for complete search history.

(56) References Cited

U.S. PATENT DOCUMENTS

| | | | | |
|---|---|---|---|---|
| 5,109,929 | A | * | 5/1992 | Spears .................... F16L 47/24 169/37 |
| 2010/0259040 | A1 | | 10/2010 | Kjolseth et al. |
| 2011/0042937 | A1 | | 2/2011 | Malagnino |
| 2017/0045068 | A1 | | 2/2017 | Sikorski |

* cited by examiner

*Fig. 4C*

CHEMICALLY JOINED SPRINKLER ASSEMBLY AND FITTING WITH INTERNAL RESERVOIR

CROSS-REFERENCE TO RELATED APPLICATIONS

The present disclosure is national phase application of International Application PCT/US2018/049961, filed Sep. 7, 2018, which claims the benefit of and priority to U.S. Provisional Application No. 62/556,046, titled "CHEMICALLY JOINED SPRINKLER ASSEMBLY AND FITTING WITH INTERNAL RESERVOIR," filed Sep. 8, 2017, the disclosure of which is incorporated herein by reference in its entirety.

BACKGROUND

Plastic pipes and fittings such as, for example CPVC pipes and fittings, are chemically joined to one another by the application of a chemical adhesive or cement. Misapplication or excessive application of the cement can soften features of the fitting, misshapen surfaces, or interfere with components coupled to the surfaces.

SUMMARY

In some embodiments, a pipe connection fitting and method of their assembly are provided having an internal reservoir for capturing excess chemical adhesive thereby preventing chemical interference with other internal surfaces and/or components of the fitting and connected components. In some embodiments, a fire protection sprinkler assembly has a connection for coupling to fluid supply pipes. The sprinkler assembly can include a connection fitting in which a sprinkler body is disposed to form a fluid tight connection. The fitting can be joined to a fluid supply pipe by a chemical adhesive using for example using a one or two-step primer and cement. In some embodiments, the fitting includes an internal reservoir for capturing excess chemical adhesive thereby preventing chemical interference with the sprinkler assembly and its operation. In some embodiments, a connection fitting is provided for joining two or more pipes or conduits by their ends. The connection fitting includes an internal reservoir for capturing excess chemical adhesive thereby preventing chemical interference with other internal surfaces and/or components of the fitting and the joined pipe ends.

BRIEF DESCRIPTION OF THE DRAWINGS

The accompanying drawings, which are incorporated herein and constitute part of this specification, illustrate embodiments of the present disclosure, and together, with the general description given above and the detailed description given below, serve to explain the features of the present disclosure. It should be understood that the disclosed embodiments are some examples of the present disclosure as provided by the appended claims.

DETAILED DESCRIPTION

The present disclosure relates generally to fire protection devices and more specifically to fire protection sprinkler assemblies, fittings and connections. FIGS. 1, 2A-2B and 3A-3B depict a sprinkler assembly 100 for the protection of an area, e.g., the protection area PA. The sprinkler assembly 100 is mounted through a barrier 10, such as for example, a ceiling barrier 10, through a hole opening in the ceiling barrier 10 for connection to a firefighting fluid supply pipe or pipe fitting 14 in the confined area or space CA to which the back surface 16 of the ceiling barrier is exposed. The sprinkler assembly 100 can include a fire protection sprinkler 110 and a connection fitting 150 to connect the sprinkler 110 to fluid supply piping or fitting 14. One end of the fitting 150 is configured for connection to the sprinkler 110. At the opposite end, the fitting 150 provides for connection to the fluid supply fitting 14. In some embodiments, the fitting 150 includes a tubular member 152 with a first end 154 for connection to the fluid supply pipe or fitting 14 and a second end 156 for receiving the sprinkler body 112. The first end 154 can define an insertion opening 154a for inserting a pipe end 14. The tubular member 152 includes an exterior surface 152a and an inner surface 152b that defines an internal conduit 158 contiguous with the insertion opening 154a which extends along a second longitudinal axis B-B. In some embodiments, the inner surface 152b defines an annular channel 169 to house the end of a fluid supply pipe 14 and, in some embodiments, provide for an internal reservoir for holding chemical adhesive or cement joining the piping components.

Figure 3A:
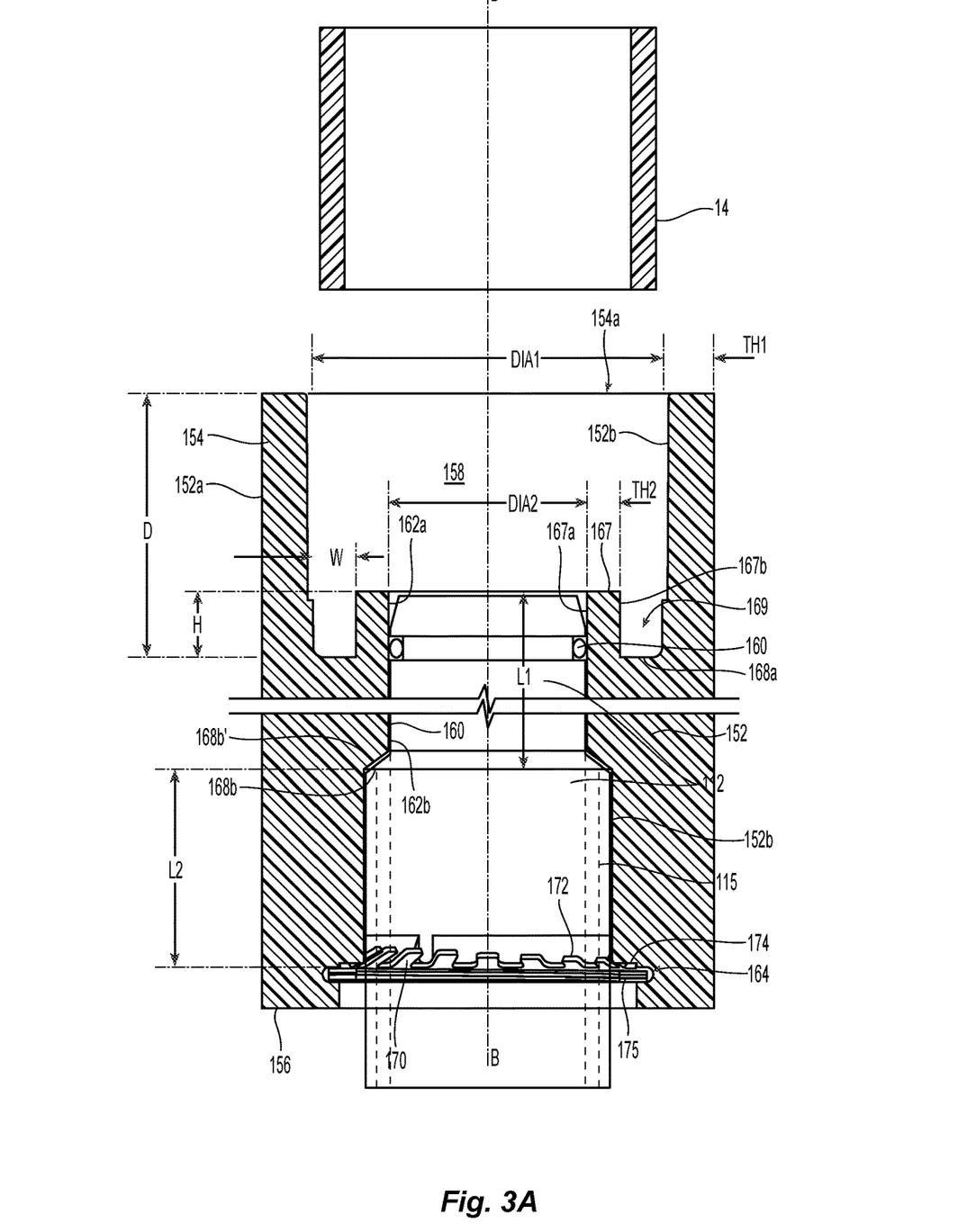
FIG. 3A is a partial exploded cross-sectional view of a sprinkler assembly of FIG. 1.

FIG. 3A depicts an insertion opening 154a and an internal conduit 158 that can be dimensioned at a diameter DIA1 for receiving a pipe of a nominal pipe size that can range by quarter inch increments from ¾ inch to 3 inch. The exterior surface 152a and an inner surface 152b defines a wall thickness TH1 that can range from 0.1 inch to 0.3 inch. The inner surface 152b can include stop surfaces 168a, 168b to limit the insertion of the fluid supply pipe fitting 14 and the sprinkler 110. The first stop surface can be formed as a floor 168a axially spaced from the insertion opening 154a to define an insertion depth D for the fluid supply pipe 14. In some embodiments the insertion depth D and stop surface can be formed as a shelf between the insertion opening 154a and the floor 168a that extends perpendicular to the longitudinal axis. The insertion depth D can range from 0.75 inch to 1.25 inch. Proximate the first end of the 154 of the tubular member 152, the inner surface 152b defines the annular channel 169 to house the end of the fluid supply pipe 14 and, in some embodiments, provide for the internal reservoir for holding chemical adhesive or cement joining the piping components.

In some embodiments, the supply piping and pipe fittings are constructed from thermoplastic material, such as Chlorinated Poly Vinyl Chloride (CPVC) material suitable for use in fire sprinkler systems. In some embodiments, the supply pipe or fittings can be formed from metallic material, such as for example, steel or brass, etc. The tubular member 152 of the fitting 150 can be constructed from similar materials. In some embodiments, such as where the fluid supply pipe 14 is CPVC or other plastic or polymeric material to be affixed within the fitting 150 by chemical adhesive, cement or glue, the annular channel 169 can provide the reservoir for housing excess glue which may otherwise seep onto an internal sealing surface 160 described herein and negatively interfere with the sealed engagement between the fitting 150 and the sprinkler body 112 and/or flow into and interfere with the sprinkler 110 itself.

For the fitting 150, a portion of the inner surface 152*b* of the tubular member 152 can define or form a cylindrical sealing surface portion 160 which circumscribes the second longitudinal axis B-B to define an internal diameter DIA2 and which extends axially in the direction of the second longitudinal axis B-B between the first and second stop surfaces 168*a*, 168*b*. Coaxially disposed along the sealing surface 160 is the sprinkler body 112. The body 112 includes an internal surface 112*a* that defines an internal passageway 114 extending between an inlet 116 and an outlet 118 of the body 112. Capturing the cement within the internal reservoir or channel 169 prevents cement from seeping into the internal passageway 114 of the sprinkler and interfering with sprinkler operation.

In some embodiments, the inner surface 152*b* of the fitting 150 includes an annular wall 167 circumscribed about the second longitudinal axis B-B adjacent the stop surface or floor 168*a*. The annular wall 167 extends axially from the floor 168*a* to define the annular channel depth H. The annular wall 167 has a first surface 167*a* extending along the sealing surface 160 and a second surface 167*b* opposite the first surface 167*a* to define the annular wall thickness TH2. The annular wall thickness TH2 of the internal wall 167 can range from 0.1 inch to 0.3 inch. The annular wall 167 can be spaced radially inward of the inner surface 152*b* with the stop surface 168*a* forming the planar floor extending perpendicular to the longitudinal axis B-B to define an annular width W of the annular channel 169. The end of the fluid supply pipe 14 defines a wall thickness; and thus, the width W of the annular channel 169 can be greater than the wall thickness of the pipe end inserted therein to provide the capacity within the annular channel 169 for the reservoir. Depending upon the nominal size of the pipe end 14, the wall thickness of the pipe end 14 can range from 0.1 inch to about 0.25 inches. In some embodiments, the pipe end can be defined by schedule being any one of 40 or 80 schedule pipe. Accordingly, the annular channel width W can range from 0.1 inch to 0.3 inch. In some embodiments, the annular channel width W or portions thereof can be smaller than 0.1 inch or larger than 0.3 inch. The annular width W can be constant over the axial depth of the annular channel 169. In some embodiments, the annular W can be variable over the channel depth H. In some embodiments, the annular channel has a first width to accommodate the end of the pipe fitting. The annular channel 169 cam define a second width narrower than the first width at a greater depth to define a shoulder limiting the insertion of the pipe end. The narrower annular channel width W forms the reservoir above the floor 168*a* of the channel for housing the excess cement.

The dimensional parameters of the fitting 150 and, in some embodiments, the pipe receiving end 154 and internal reservoir 169, can define one or more dimensional relationships to facilitate connection to the fluid supply. For example, the first stop surface 168*a* and annular wall 167 can define a ratio of insertion depth D-to-annular wall axial height H (D:H) as ranging from greater than 1:1 to 4:1. In some embodiments, the ratio can be greater than 4:1. In some embodiments, the insertion opening 154*a* and the annular channel 169 can define a ratio of nominal diameter DIA1 to annular channel width W as ranging from 6:1 to 10:1 or greater than 10:1. In some embodiments, the ratio of the nominal diameter DIA1 of the insertion opening 154*a* to the internal diameter DIA2 of the sealing surface 160 ranges from greater than 1:1 to 2:1 or greater.

At the opposite end 156 of the fitting 150, the sprinkler 110 is axially inserted or pushed into the fitting 150 to form a fluid tight connection along the sealing surface 160. The sprinkler body 112 has an outer encasing surface 112*b* that surrounds the longitudinal axis A-A. The outer encasing surface 112*b* of the sprinkler body 112 includes a first portion along which a seal member 111 is located and defines a first diameter D1 sized to support the seal member 111 engagement with the cylindrical sealing surface 160 of the fitting 150. In some embodiments, the outer encasing surface 112*b* includes an annular groove 113 that is formed about and circumscribes the body 112 with the sealing member 111 disposed and secured within the annular groove 113. The sealing surface 160 can form a fluid tight seal with the annular sealing member 111 upon insertion and engagement. In some embodiments, the sealing member 111 is affixed along the sealing surface 160 and a fluid tight seal is formed with the sprinkler body 112 outer casing upon insertion and engagement through the member 111. The sealing surface 160 has a first end 162*a* and a second end 162*b* with the axial length of the sealing surface 160 extending between the first and second ends 162*a*, 162*b* to define the range over which the sealing contact between the surface 160 and the sealing member 111 can be located. By providing a range of locations over which a fluid tight seal can be formed, there can be flexibility in completing the sprinkler assembly 100 and the relative spacing between the components of tubular member 152 and the sprinkler 110. In some embodiments, the fluid tight seal formation can be limited to a fixed relative axial position between the tubular member 152 and the sprinkler body 112.

The encasing surface 112*b* includes a second portion having a second diameter D2 that can be greater than the first diameter D1. The difference in diameters D1, D2 between the first and second portion defines a step transition or shoulder surface separating the first portion and second portions of the encasing surface 112*b* which can contact the second stop surface 168*b* of the tubular member 152 to define the insertion limit of the sprinkler 110. In some embodiments, the second end 156 of the tubular member 152 can include or form the second stop surface 168*b* that interferes with the sprinkler frame arms 126 or other sprinkler surface to limit the insertion of the sprinkler body 112. To maintain the sprinkler 110 coupled to the tubular member 152 and prevent undesired or accidental axial translation or withdrawal out of the tubular member, the sprinkler 110 can be mechanically and adjustably axially held, retained or supported within the tubular member 152. In some embodiments, the fitting 150 includes a gripper ring 170 which is disposed along the inner surface 152*b* of the tubular member 152 of the fitting 150. The gripper ring 170 can include an annular base 174 from which fingers or prongs 172 extend radially inward to engage the sprinkler body 112 and hold, retain or support the sprinkler 110 within the fitting 150.

FIG. 3A depicts an embodiment of the sprinkler body 112 and the gripper ring 170 within the fitting 150. The outer encasing surface 112*b* can include a surface formation 115 to make an adjustable mechanical connection with the internal gripper ring 170 of the fitting 150 to adjustably form and locate the fluid tight seal of the seal member 111 within the fitting 150 and couple to the sprinkler 110 and tubular member 152 to one another. As the sprinkler is axially inserted and translated within the tubular member 152 from the second end 156 to the first end, the fingers or prongs 172 of the gripper ring 170 are splayed outwardly by the passing sprinkler. With the prongs of the gripper ring 170 splayed outwardly, the sprinkler body can be linearly inserted to its installed position. In order to release the sprinkler 110 from the fitting 150 for removal or adjustment, the engagement between the gripper ring 170 and the sprinkler 110 limits the sprinkler body 112 to linear and rotational translation with respect to the tubular member 152 in the direction from the first end 154 to the second end 156 of the tubular member 152. Linearly withdrawing the sprinkler 110 from the tubular member results in the thread elements forcing the prongs 172 of the gripper ring 170 radially inward to grip the sprinkler body 112. In order to remove the sprinkler or disengage the fluid tight seal, the sprinkler 110 is linearly and rotationally translated by unthreading the sprinkler with respect to the tubular member 152 from the first end 154 to the second end 156.

Figure 3B:
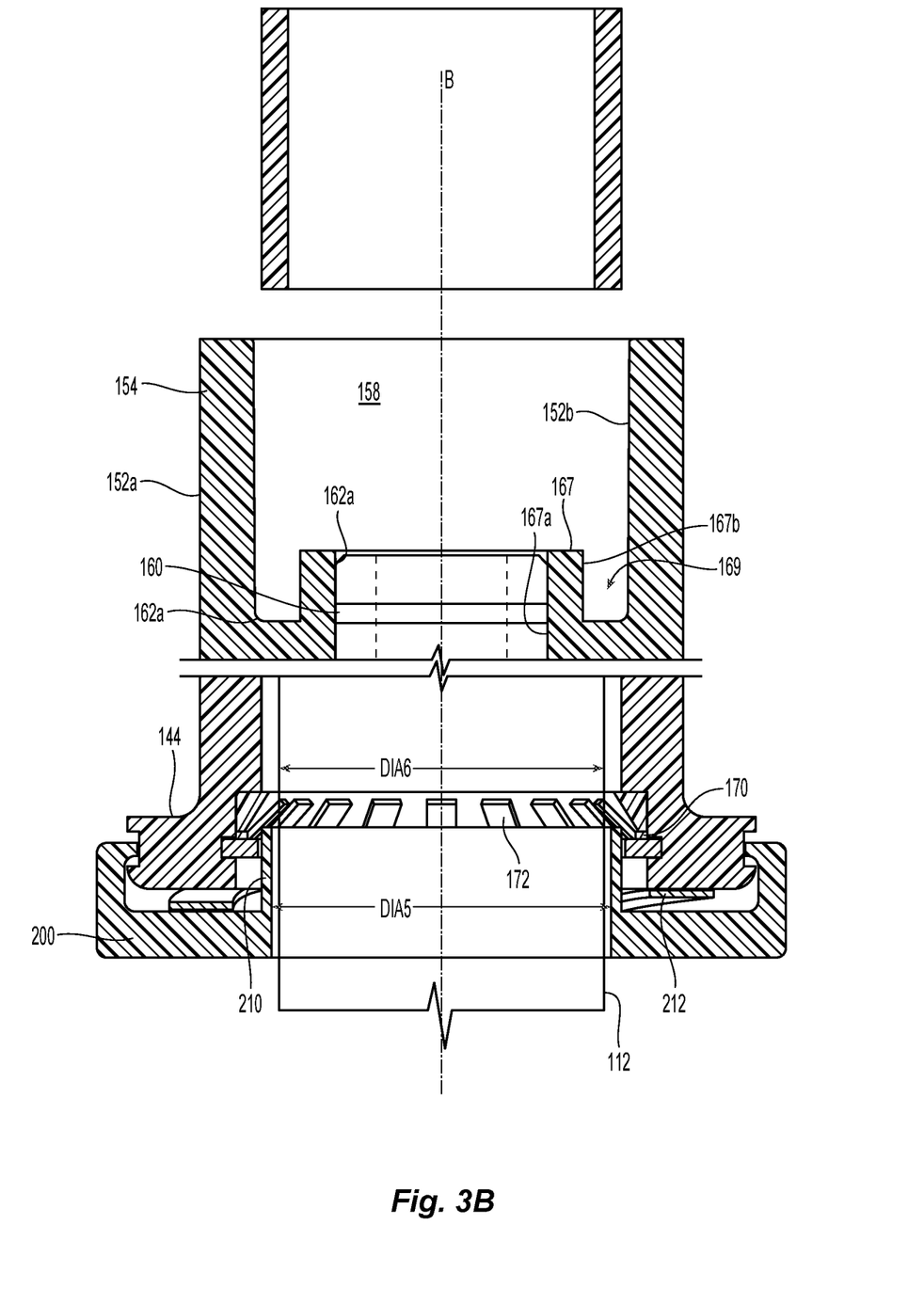
FIG. 3B is a partial exploded cross-sectional view of an embodiment of the connection fitting for use in the sprinkler assembly of FIG. 1.

FIG. 3B depicts an embodiment of the fitting 150 having a releasing member 200 coupled to the tubular member 152. The releasing member 200 includes an internal annular formation 210 that contacts the gripper ring to control the outwardly splay the resilient prongs 172 of the gripper ring 170 out of engagement with the sprinkler body 112. In some embodiments, by axially translating the releasing member 200 relatively from the second end 156 to the first end 154 of the fitting 150, the internal annular formation 210 open the prongs 172 of the gripper ring 170. With the prongs open, the sprinkler body 112 can be inserted through the annular formation 210 and into sealed engagement with the sealing surface 160. In some embodiments, a biasing element 212 returns the releasing member to its initial position which allows the prongs 172 of the gripper ring to engage the sprinkler body 112 to support and retain the sprinkler in its sealed position.

Figure 1:
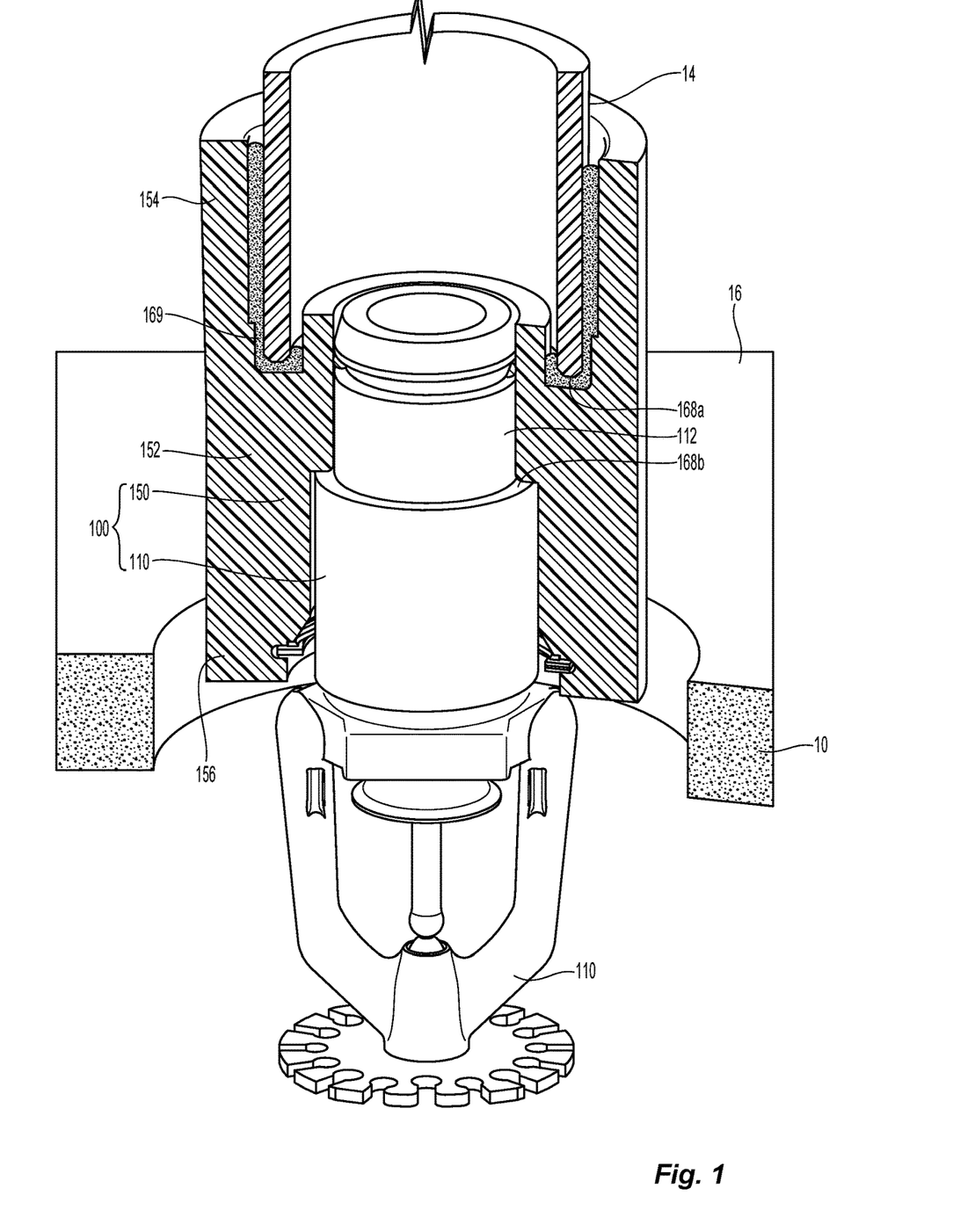
FIG. 1 is a diagram of an embodiment of a sprinkler assembly and installation with a connection fitting.
Figure 2A:
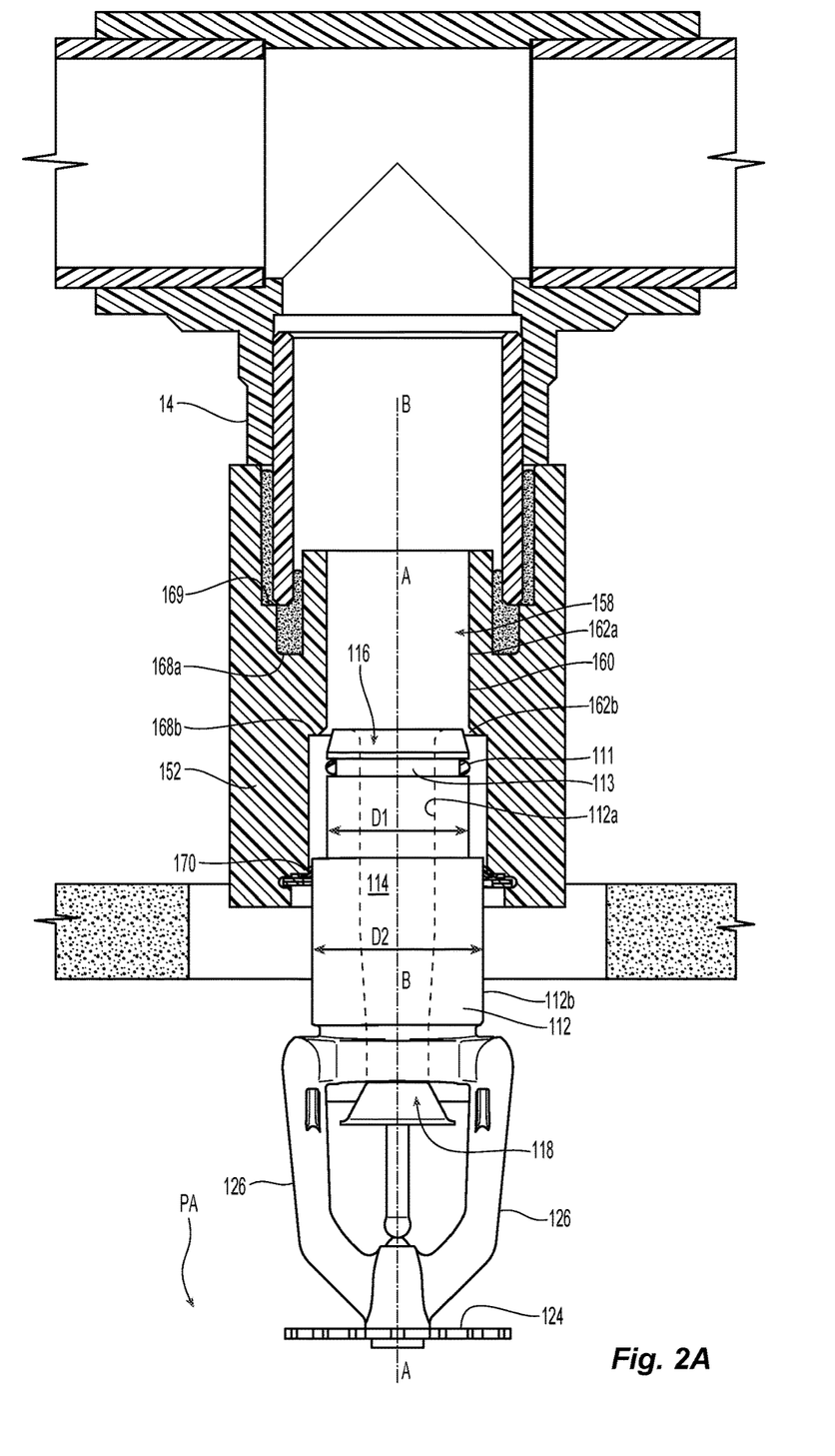
FIG. 2A is a cross-sectional view of the sprinkler assembly installation of FIG. 1 in an unsealed connection.
Figure 2B:
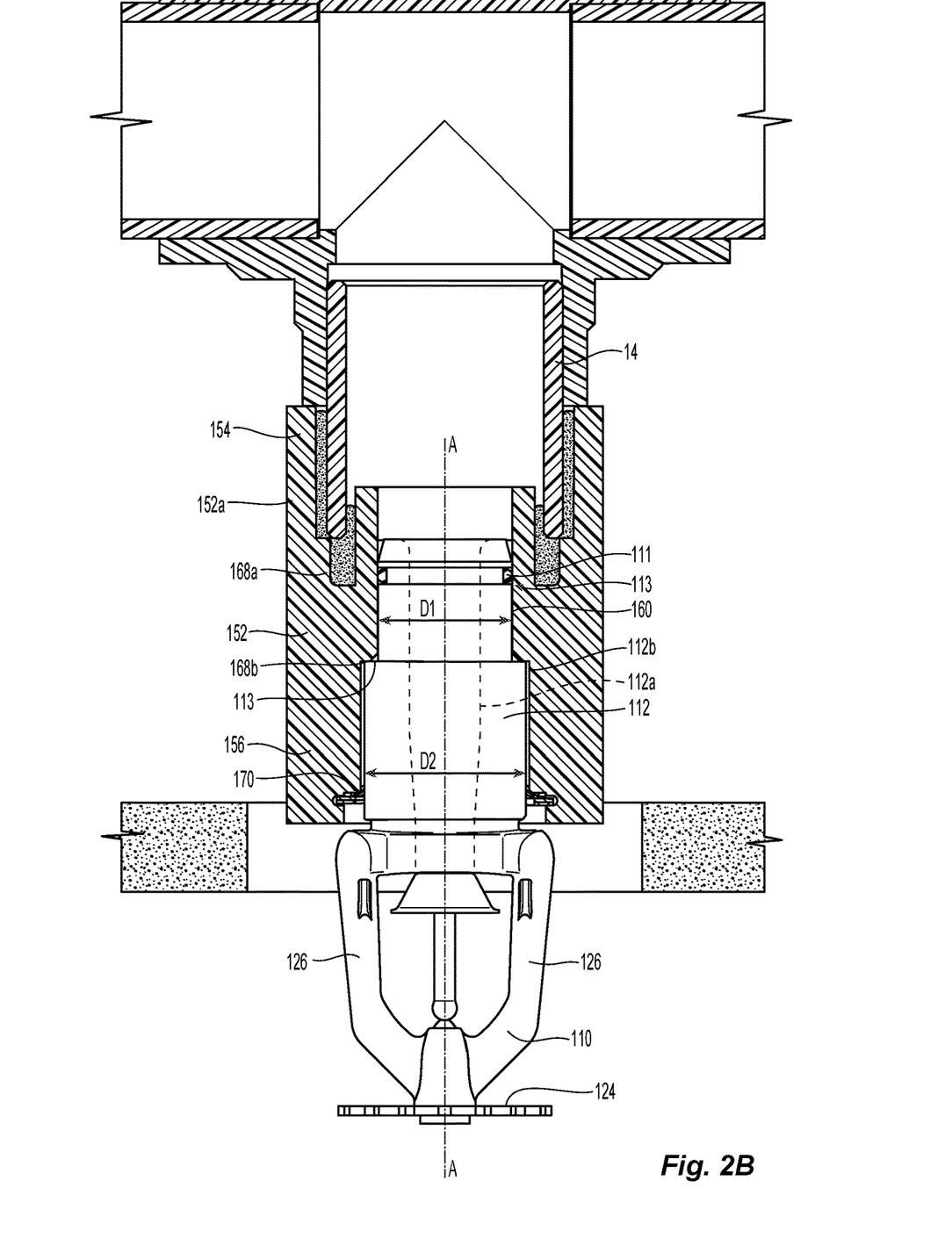
FIG. 2B is a cross-sectional view of the sprinkler assembly installation of FIG. 1 in a sealed condition.

The adjustability between the connection fitting 150 and the sprinkler assembly 110 can provide for an adjustable installation in order to locate sprinkler operation components, such as for example, a fluid distribution member with respect to the ceiling 10. In some embodiments, the sprinkler 110 for use with the fitting 150 includes a deflector 124 supported by the body 112 and spaced from the outlet 118. As depicted in FIGS. 2A and 2B, the deflector 124 can be secured to a pair of frame arms 126 which depend from the sprinkler body 112. As depicted, the frame arms 126 locate the deflector 124 at the desired fixed axial distance from the outlet 118. In some embodiments, the frame arms can provide for a "drop down" arrangement in which the arms deploy from an unactuated concealed position to an actuated deployed position. The internal passageway 114 and outlet 118 are dimensioned and geometrically configured so as to affect desired discharge characteristics for the deflector 124 to provide for a sprinkler spray pattern that can effectively address a fire. The deflector can have any suitable geometry and configuration for a particular application. In some embodiments, the deflector can be configured as a substantially planar member 124 used in a pendent configuration as shown or as a hooded deflector 124 for use in a horizontal orientation. The deflector 124 can be domed for an upright sprinkler construction.

Figure 4A:
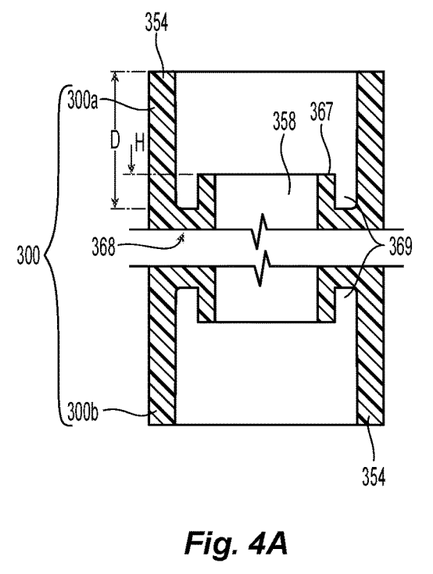
FIGS. 4A-4C are partial cross-sectional views of embodiments of a pipe connection fitting.
Figure 4B:
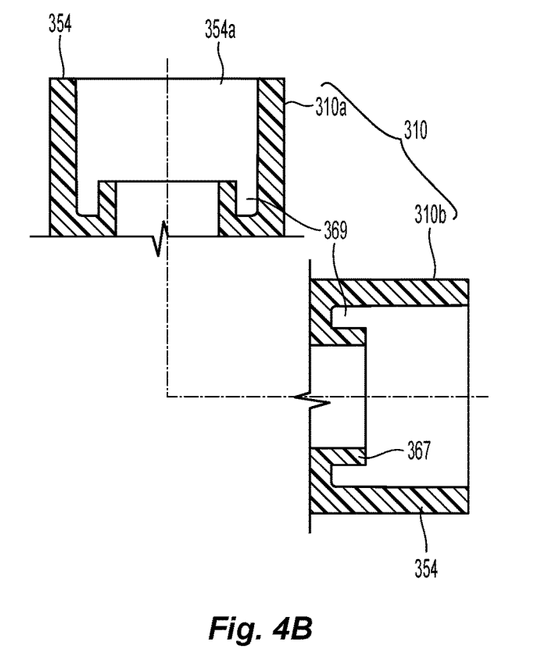
Figure 4C:
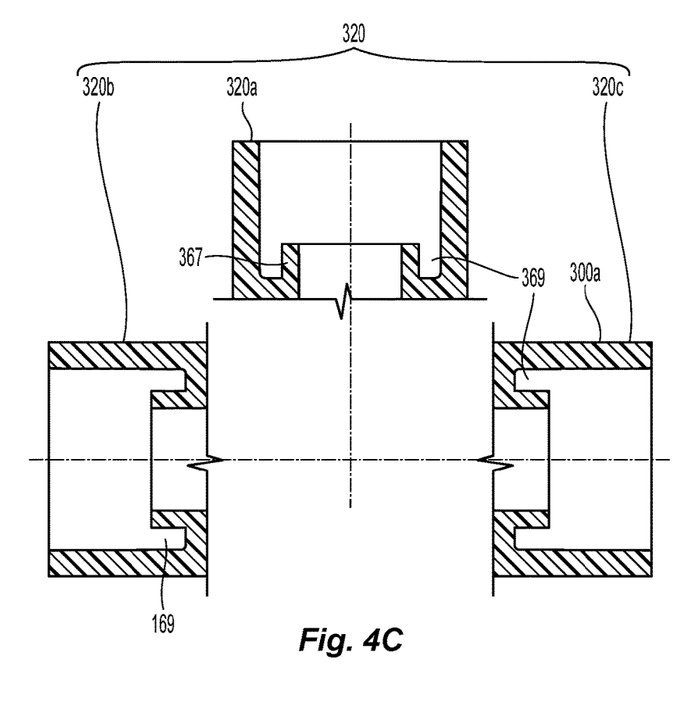

Regardless of the mechanism by which a sprinkler is retained within the fitting 150, the internal reservoir 169 at the pipe connection end 154 of the fitting prevents the chemical cement from interfering with either the fluid tight seal formation with the sprinkler body 112 or the internal operational components of the sprinkler 110 itself. The annular channel 169 can also be incorporated into a connection fitting for joining two or more pipe ends or elements. Depicted in FIGS. 4A-4C are d embodiments of pipe connection fittings 300, 310, 320 having two or more ends with an internal reservoir formed therein for receipt of a conduit or pipe end and capturing excess joining cement. For example, a pipe union 300 is depicted in FIG. 4A, an elbow 310 is depicted in FIG. 4B, and a tee-fitting 320 is depicted in FIG. 4C. In each fitting end shown, an internal reservoir can be formed as an annular channel 369 as previously described. Accordingly, each end defines one or more dimensional parameters previously described with respect to the pipe receiving end of the fitting 150 for receipt of a pipe end and adhesive cement. For example, each end 354 includes an insertion opening 354a with a stop surface 368 that can be located to define an insertion depth D and limit the insertion of a pipe end. In some embodiments, an annular wall 367 is formed radially inward of the inner surface of the fitting to provide for the annular channel or reservoir 369. The annular wall 367 circumscribes a central axis of the fitting to define a passageway 358 for fluid to flow through in a desired manner. The dimensional parameters of the fittings and, in some embodiments, the pipe receiving end 354 and internal reservoir 369 can define one or more dimensional relationships to facilitate connection to the fluid supply. For example, the stop surface 368 and annular wall 367 can define a ratio of insertion depth D-to-annular wall axial height H (D:H) as ranging from 1:1 to 4:1. In some embodiments, the ratio can be greater than 4:1. In some embodiments, the insertion opening 154a and the annular channel 169 can define a ratio of nominal diameter DIA1 to annular channel width W as ranging from 6:1 to 10:1 or greater than 10:1. In some embodiments, the ratio of the nominal diameter DIA1 of the insertion opening 154a to the internal diameter DIA2 of the sealing surface 160 ranges from 1:1 to 2:1 or greater.

While the present disclosure has been disclosed with reference to certain embodiments, numerous modifications, alterations, and changes to the described embodiments are possible without departing from the sphere and scope of the present disclosure, as defined in the appended claims. Accordingly, it is intended that the present disclosure not be limited to the described embodiments, but that it has the full scope defined by the language of the following claims, and equivalents thereof.

What is claimed is:

1. A sprinkler assembly comprising:
a sprinkler body;
a tubular connection fitting with a first end for connection to a fluid supply pipe and a second end with the sprinkler body inserted therein, the tubular connection fitting comprising a tubular member including an outer surface and an inner surface defining an internal conduit extending along a longitudinal axis,
the inner surface of the tubular member includes a first stop surface spaced from the first end to define an insertion depth for the fluid supply pipe, an annular wall inward from the stop surface, and a second stop surface to limit insertion of the sprinkler body into the second end, the first stop surface is a first distance from the second end, the annular wall is a second distance from the second end greater than the first distance such that the first stop surface is closer to the second end than the annular wall is to the second end, wherein the first stop surface defines an annular channel for housing an end of the fluid supply pipe; and a ring sized to be received between the sprinkler body and the tubular member, the ring comprising a base and a plurality of prongs extending inward from the base.

2. The sprinkler assembly of claim 1, wherein the annular wall is spaced radially inward of the inner surface with the first stop surface extending from the annular wall to the inner surface perpendicular to the longitudinal axis to define an annular width of the annular channel between the inner surface and the annular wall.

3. The sprinkler assembly of claim 2, wherein the first end defines an insertion opening and a nominal diameter of the insertion opening, the first stop surface being axially spaced from the insertion opening to define the insertion depth, the annular wall defining an axial height and a wall thickness.

4. The sprinkler assembly of claim 3, wherein the ratio of the nominal diameter of the insertion opening to the annular width of the annular channel ranges from 6:1 to 10:1 or greater.

5. The sprinkler assembly of claim 3, wherein the tubular connection fitting includes a sealing surface extending between the first stop surface and the second stop surface, the sealing surface defining an internal diameter.

6. The sprinkler assembly of claim 3, wherein the wall thickness of the annular wall ranges from 0.1-0.3 inch.

7. The sprinkler assembly of claim 1, wherein at the first end, the outer surface and the inner surface define a wall thickness that ranges from 0.1-0.3 inch.

\* \* \* \* \*